July 11, 1961
J. D. BOTTORF ET AL
2,991,937
AIR BLENDER
Filed Jan. 20, 1959
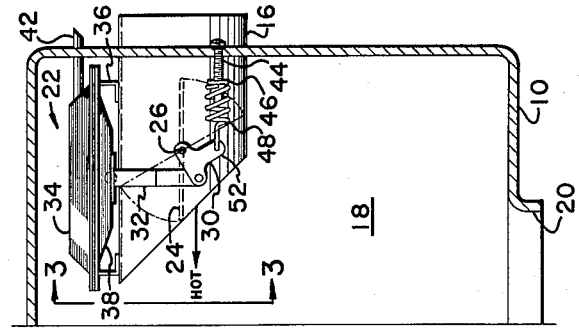
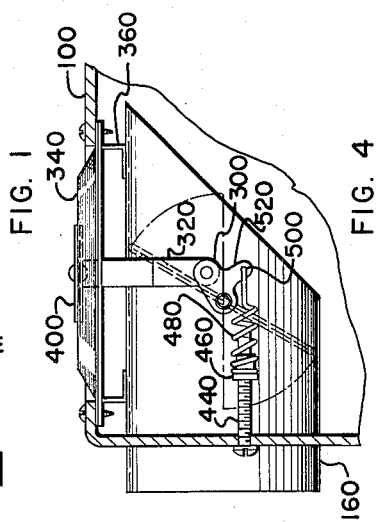
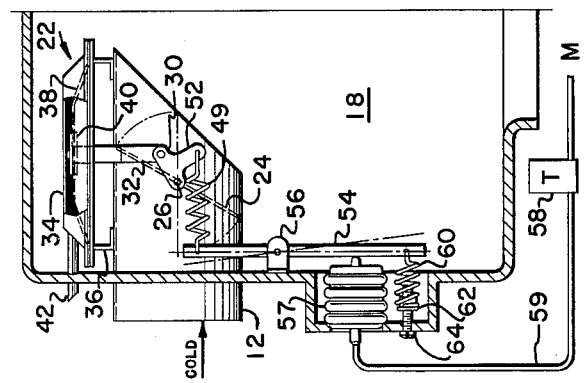
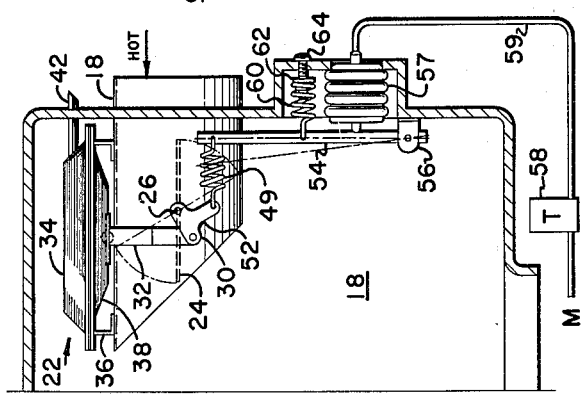
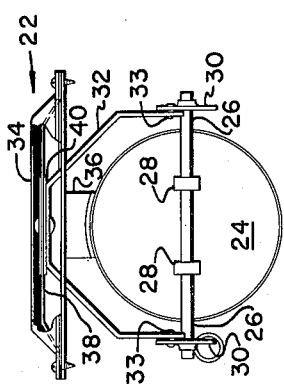
INVENTORS
JAMES D. BOTTORF
ROBERT G. MINER
BY
Holmes & Andersen
ATTORNEYS

United States Patent Office 2,991,937
Patented July 11, 1961

2,991,937
AIR BLENDER
James D. Bottorf and Robert G. Miner, La Crosse, Wis., assignors to The Trane Company, La Crosse, Wis., a corporation of Wisconsin
Filed Jan. 20, 1959, Ser. No. 787,986
7 Claims. (Cl. 236—13)

This invention relates to air regulating apparatus and more particularly to apparatus which receives hot and cold air from a high velocity source and mixes the hot and cold air in accordance with the requirements of the conditioned space which receives the mixed air flow.

One object of the invention is to provide an improved temperature control apparatus for high pressure double duct air conditioning systems.

A second object of the invention is to provide an economical air blending apparatus which has a minimum number of elements and does not require constant readjustment.

Another object of the invention is to provide an air blending apparatus which is economical to manufacture, easy to assemble, compact, and does not require constant balancing.

A still further object of the invention is to provide an air blending box for a double duct high velocity system which does not require the warm and cold inlets to be located in fixed relation to one another.

A fifth object of the invention is to provide an air blending box for double duct high velocity air conditioning systems which requires temperature control of only one air inlet to maintain substantially a constant volume of air from the mixing plenum outlet.

Another object of the invention is to provide an air blender which will maintain a proper relationship between the hot and cold air over a wide range of hot and cold supply duct pressures.

FIG. 1 is a schematic view of the air mixing apparatus with a temperature regulating control connected to the cold air inlet.

FIG. 2 is a schematic view of the invention with the temperature regulating control connected to the warm air inlet.

FIG. 3 is a view on line 3—3 of FIG. 1 showing the mechanical linkage between the pressure responsive member and the inlet air damper.

FIG. 4 is a partial schematic view of another manner in which the pressure responsive element of FIGS. 1-3 may be attached to the air blender.

In the drawings, similar components will be denoted with the same reference number. Schematically we have shown our apparatus controlled by a pneumatic system but this is merely exemplary since obviously an electric thermostat and an electric damper motor could be used without avoiding the basic principle of our invention.

Looking now to FIGS. 1–3, the numeral 10 designates an air blender casing in which is located cold air inlet connections 12 and 14 and warm air inlet connections 16 and 18. In normal operation, hot and cold air from a high velocity dual duct system (not shown) supplies hot and cold air to their respective inlet connections. The warm and cold air passes through these connections into the mixing chamber 18 from which the mixed air passes to the conditioned space through outlet 20 in the casing 10.

The static pressure responsive elements 22 and associated damper operator mechanism attached to each hot air inlet connection 16 and 18 and to each cold air inlet connection 12 and 14 are identical in construction and the following description will apply to each.

The inner end of warm air inlet connection 16 terminates in a plane making an angle of 45° with the horizontal axial plane of the conduit. The purpose of the inclined end on the inlet connection is to reduce the noise of the air in flowing from the inlet connections to the mixing chamber. A damper or valve member 24 is secured to shaft 26 by straps 28 which are spot welded to the shaft 26 and the damper or valve member 24. The shaft 26 is rotatably mounted in the inlet connection in any suitable manner. Levers 30 are press-fitted or otherwise secured to each end of the shaft 26. A yoke 32 is pivotally connected to levers 30 by headed pins 33 which are riveted to levers 30. Secured between the cover 34 and the supporting flanges 36 is a diaphragm 38 of a flexible air impervious material such as a coated fabric. It should be noted (FIG. 3) that supporting flanges 36 do not enclose the underside of diaphragm 38 so that diaphragm 38 is exposed to the air pressure within the mixing chamber 18.

Yoke member 32 is secured to diaphragm 38 by rivet 40. A tube 42 is connected to the cover 34 as by brazing or soldering. The outer end of the tube 42 extends through and is secured to the casing 10. The exterior of the casing 10 is at atmospheric pressure and therefore, the chamber between the diaphragm 38 and the cover 34 is maintained at atmospheric pressure. A screw 44 is threaded in nut 46 to which one end of a spring 48 is secured. The other end of spring 48 hooks into a hole 50 in arm 52 of lever 30. Prior to installation, the screw 44 may be adjusted to the approximate point desired in order to maintain a predetermined pressure in the mixing chamber 18. The screw 44 is also accessible for purposes of readjustment, if necessary, after installation of the unit.

Looking specifically at the preferred form of the invention (FIGS. 1 and 3), a pneumatic controller is shown attached to the damper linkage of cold air inlet connection 12. Spring 49 instead of being connected to an adjusting screw is connected to lever arm 54 pivotally secured to flange member 56 which is connected by any suitable means to casing 10. Lever arm 54 abuts pneumatically operated bellows 57. Bellows 57 is connected to a source of air by conduit 59 through direct acting modulating thermostat 58 located in the conditioned space. A spring means 60 is connected to lever arm 54 and is connected at the other end to an adjusting nut 62 threadably secured on adjusting screw 64. It can readily be seen that the tension on spring 60 may be adjusted by adjusting screw 64.

It should be noted that diaphragm 38, damper or valve member 24, and the above described means connecting these members constitute a pressure regulator. For all practical purposes the range of reaction of the springs 48 and 49 would be the throttling range of the pressure regulator so hereinafter the springs 48 and 49 will be referred to as having a throttling range which by definition is the throttling range of the pressure regulator. Such throttling range will be described hereinafter.

Basic operation

The static pressure of the mixing chamber 18 acts on the underside of diaphragms 38 and acts against the tension of springs 48 and 49 to move the dampers 24 to the position indicated by the tension setting of springs 48 and 49. In our invention, we vary the tension of one of the damper springs in response to variations in the temperature of the conditioned space. As a practical matter, the range of variation on the controlled spring brackets the fixed spring tension on the other outlet. For example, looking at FIG. 1, if the tension of spring 48 is set to maintain .2″ static pressure, the maximum and minimum tension settings of spring 49 would be approximately .3″ static pressure and .15″ static pressure. As is well known in the art, regulator springs 48 and 49 have a throttling range which means that when the controlled spring tension exceeds the fixed spring tension that the damper connected to the fixed tension spring slowly closes as the mixing chamber pressure rises until the static pressure of the mixing chamber exceeds the throttling range of the fixed spring and the damper attached thereto is completely closed. Conversely, when the controlled spring tension setting is below that of the fixed spring then the controlled damper will slowly close until the throttling range of the controlled spring is exceeded and the controlled damper is closed.

Further, the use of pressure regulators responsive to the static pressure of the mixing chamber holds the quantity of air flowing from outlet 20 substantially constant for a particular temperature setting. If the air pressure in either or both of the high velocity ducts feeding the hot and cold air inlets should rise or fall, the diaphragm members will sense this rise or fall of pressure since the mixing chamber pressure will also rise or fall and will open or close dampers 24 to maintain a constant static pressure and consequently a constant outlet volume of air.

Operation of FIG. 1

Using the above exemplary figures, assume that the spring tension of spring 48 is set to maintain .2" static pressure in the mixing chamber and that the temperature of the conditioned space is such that neither heating and cooling is required thereby positioning lever arm 54 in the intermediate position to set the tension on spring 49 to maintain approximately .2" static pressure. With both springs 48 and 49 set for .2" static pressure, approximately equal amounts of hot and cold air will be mixed in the mixing chamber and distributed to the conditioned space.

Assuming now that the temperature in the conditioned air has risen and the thermostat 48 is calling for cooling, air pressure is then fed to bellows 57 and bellows 57 expands and pivots lever arm 54 thereby increasing the tension on spring 49. Lever 30 is then pulled towards lever arm 54 thereby rotating cold air damper towards the open position and pulling yoke 32 of the cold inlet connection 12 downward. As set forth above, the maximum spring tension will be set for approximately .3" static pressure and the minimum set for approximately .15". Obviously, since the spring tension on the warm air inlet is set for .2" static pressure, then the spring tension of spring 49 will have to increase in order to provide more cool air than hot air. Therefore, as the temperature in the conditioned space calls for cooling, the spring tension on spring 49 will be increased in order to open the cold air inlet damper. As the spring tension of spring 49 increases, the static pressure in the mixing chamber will increase. As the static pressure increases above .2", the warm air damper will slowly close since spring 48 is set to maintain .2" static pressure and the increased pressure due to the change of the tension setting spring 49 will act on the bottom of the warm air inlet pressure regulator to raise the diaphragm 38 and rotate the warm air inlet damper to the closed position. As discussed previously, warm air damper 24 will not close completely until the throttling range of spring 48 is exceeded. Once this throttling range is exceeded, warm air damper 24 will be closed completely. Then the air blender will be supplying all cold air and the unit will be in the all cool position.

Conversely, when the temperature of the space drops below a predetermined level, the spring tension of spring 49 will be decreased below the mean setting of .2" static pressure and the cool air damper will tend to close and the warm air damper will tend to open. When the room conditions are such that full heating is required, the pneumatic thermostat 58 reduces the air pressure to bellows 57 to zero, and the spring tension of spring 49 is reduced to the selected minimum, which in our example is .15" static pressure, and the cold air damper will be completely closed and the warm air damper will be wide open. Obviously, as the spring tension of spring 49 decreases, the static pressure established by the warm air inlet will act on the cold air inlet pressure regulator diaphragm to force same upwards and tend to close the cold air inlet damper.

Obviously, this form of the invention provides a higher static pressure for cooling than it does for heating (e.g., .3" static for cooling and .2" static for heating). In a majority of applications, the amount of cool air required on full cooling is greater than the amount of warm air required on full heating. Obviously, we have provided an air blender which will automatically provide this arrangement.

Operation of FIG. 2

In FIG. 2, there is shown another arrangement of our control which provides more warm air on heating when on full heating than on full cooling. In this form of the invention, our pneumatic control is connected to the warm air inlet connection 18. Again, for example, spring 49 is controlled between settings which will provide a maximum of .3" static and a minimum of .15" static. The spring 48 is set to maintain a constant static pressure of .2". The apparatus of FIG. 2 operates in the same manner as FIG. 1 except that spring tension of spring 49 is reduced to a minimum when full cooling is required and is at a maximum when full heating is required.

A further modification of the invention is shown in FIG. 4. This modification can be made to either form of the invention shown in either FIG. 1 or FIG. 2. The modification of FIG. 4 eliminates the use of tube 42 and cover 34 of the pressure responsive member 22. The diaphragm 340 is mounted directly to the casing 100. This form of the invention provides a very economical application of the principles set forth in FIGS. 1–3.

Our new and improved air blender offers many obvious advantages. One advantage being that we have provided a unit which maintains predetermined conditions and requires no physical mechanical interconnection between the hot and cold air inlets thereby allowing the cold and warm air inlets to be placed in any position in the blending box. Secondly, we have provided an automatic air blending apparatus which requires very little balancing or readjustment once it has been set in use. Further, if readjustment is necessary, it is merely a matter of adjusting two screws which does not require an experienced operator or a lot of complicated instruments. Thirdly, our improved air blending apparatus is economical to manufacture and easy to install. The number of moving elements in our air blending apparatus is held to a minimum thereby reducing the cost of repair, if necessary. Further, our new and improved air blender provides a simple and economical apparatus which not only controls the proper blending of hot and cold air in response to required temperature conditions but also compensates for any rise and fall of pressure in the high velocity ducts supplying the unit.

Although we have described in detail the preferred embodiments of our invention, we contemplate that many changes may be made without departing from the scope or spirit of our invention, and we desire to be limited only by the claims.

We claim:

1. An air blender for controlling the temperature in a conditioned space comprising a casing, a hot air supply conduit and a cold air supply conduit connected to said casing, means forming a mixing chamber in said casing, an exhaust opening in said casing and communicating with said mixing chamber, a damper member rotatably mounted in each of said conduits, pressure responsive means connected to each of said dampers and mounted directly on said conduits to control the opening of said dampers in response to the static pressure of the mixing chamber, spring means connected to the means connecting said damper to said pressure responsive means to bias said damper towards the open position, and temperature responsive means connected to the spring means of only one of said dampers to vary the bias of said spring means in response to a variation of temperature in the conditioned space.

2. An air blender for controlling the temperature in a conditioned space comprising a casing, a hot air supply conduit and a sold air supply conduit connected to said casing, means forming a mixing chamber in said casing, an exhaust opening in said casing and communicating with said mixing chamber, a damper rotatably mounted in each of said conduits, said damper mounting means extending through opposite sides of said conduits, means mounting a diaphragm member on each of said conduits so that one side of said diaphragm member is exposed to atmospheric pressure and the other side of said diaphragm is exposed to mixing chamber pressure, means connecting said diaphragms to said damper members to position said dampers in accordance to mixing chamber static pressure, said means connecting said diaphragms being located externally of said conduits and being connected to the extermities of said damper mounting means, and means connected to only one of said connecting means to vary the position of the damper connected thereto in response to a variation of temperature in the conditioned space.

3. An air blender for controlling the temperature in a conditioned space comprising a casing, a hot air supply conduit and a cold air supply conduit connected to said casing, means forming a mixing chamber in said casing, an exhaust opening in said casing and communicating with said mixing chamber, a damper rotatably mounted in each of said conduits, means mounting a diaphragm member on each said conduits so that one side of said diaphragm member is exposed to atmospheric pressure and the other side of said diaphragm is exposed to mixing chamber pressure, means connecting said diaphragms to said damper members to position said dampers in accordance to mixing chamber static pressure, spring means connected to said connecting means to bias said dampers towards the open position, and temperature responsive means connected to the spring means of only one of said dampers to vary the bias of said spring means in response to a variation of temperature in the conditioned space.

4. An air blender for controlling the temperature in a conditioned space comprising a casing, a hot air supply conduit and a cold air supply conduit connected to said casing, means forming a mixing chamber in said casing, an exhaust opening in said casing and communicating with said mixing chamber, a damper rotatably mounted in each of said conduits, means mounting a diaphragm member on each of said conduits so that one side of said diaphragm member is exposed to atmospheric pressure and the other side of said diaphragm is exposed to mixing chamber pressure, a lever secured to each of said dampers, means connecting said levers to said diaphragms, a spring member secured to one of said damper levers and held in tension by said casing to bias said damper towards the open position, a second spring member with one end connected to the other damper lever, a lever arm pivotally secured in said casing, said second spring member being attached at said other end to said lever arm, means biasing said lever arm so that said second spring member is under tension, and temperature responsive means operably associated with said lever arm to pivot said lever arm and thereby vary the tension of said second spring member in response to a temperature change in the conditioned space.

5. The structure of claim 1 wherein said damper mounting means extend through opposite sides of said conduits, and said connection between said pressure responsive means and said damper member being located externally of said conduits and being connected to the extremities of said damper mounting means.

6. The structure of claim 3 wherein said damper mounting means extend through opposite sides of said conduits, and said means connecting said diaphragms to said damper members being located externally of said conduits and being connected to the extremities of said damper mounting means.

7. The structure of claim 4 wherein said damper mounting means extend through opposite sides of said conduits, and said means connecting said diaphragms to said damper members being located externally of said conduits and being connected to the extremities of said damper mounting means.

References Cited in the file of this patent

UNITED STATES PATENTS

| | | |
|---|---|---|
| 1,455,633 | Ludgaard | May 15, 1923 |
| 2,212,285 | Ayers | Aug. 20, 1940 |
| 2,508,074 | Miller et al. | May 16, 1950 |
| 2,535,893 | Branson | Dec. 26, 1950 |
| 2,828,076 | Donahue | Mar. 25, 1958 |
| 2,835,449 | Joesting | May 20, 1958 |
| 2,844,322 | Kautz | July 22, 1958 |
| 2,888,948 | Pellmyr et al. | June 2, 1959 |